United States Patent [19]

Seki et al.

[11] Patent Number: 4,871,695

[45] Date of Patent: Oct. 3, 1989

[54] PROCESS FOR THE PRODUCTION OF GLASS

[75] Inventors: Koji Seki, Tokyo; Hiroshi Morishita, Kawasaki; Kiyoshi Ohno, Yokohama; Hiroshi Yokota, Tokyo, all of Japan

[73] Assignee: Japan Oxygen Co., Ltd., Japan

[21] Appl. No.: 277,452

[22] Filed: Oct. 17, 1988

Related U.S. Application Data

[63] Continuation of Ser. No. 42,570, Apr. 22, 1987, abandoned, which is a continuation of Ser. No. 767,194, Aug. 19, 1985, abandoned.

[30] Foreign Application Priority Data

| Aug. 30, 1984 | [JP] | Japan | 59-181586 |
| Aug. 30, 1984 | [JP] | Japan | 59-181587 |
| Aug. 30, 1984 | [JP] | Japan | 59-181588 |
| Aug. 2, 1985 | [JP] | Japan | 60-170663 |
| Aug. 2, 1985 | [JP] | Japan | 60-170664 |

[51] Int. Cl.$^4$ .......................... C03C 3/06; C03C 3/04
[52] U.S. Cl. ........................................ 501/54; 501/53; 65/32.1; 65/32.2; 65/32.3; 65/32.4; 65/DIG. 8; 65/DIG. 16; 65/18.1; 65/30.1
[58] Field of Search ............. 65/17, 18.1–18.5, 65/21.1, 30.1, 32.1–32.4, 33, 152, DIG. 8, DIG. 16, 900, 901; 501/54, 53, 11, 31

[56] References Cited

U.S. PATENT DOCUMENTS

| 3,883,337 | 5/1975 | Helgesson et al. | 65/33 |
| 3,927,697 | 12/1975 | Baumler et al. | 65/33 |
| 4,042,361 | 8/1977 | Bihuniak et al. | 65/18.1 |
| 4,093,771 | 6/1978 | Goldstein et al. | 65/30.1 |
| 4,146,379 | 3/1979 | Copley et al. | 65/30.1 |
| 4,225,330 | 9/1980 | Kakuzer et al. | 65/30.1 |
| 4,429,009 | 1/1984 | Pastor et al. | 65/33 |
| 4,465,656 | 8/1984 | Pastor et al. | 65/33 |

FOREIGN PATENT DOCUMENTS 8705286 11/1987 Japan .

OTHER PUBLICATIONS

Rabinovich et al., "Preparation of High-Silica Glasses from Colloidal Gels: I, Preparation for Sintering and Properties of Sintered Glasses", *Journal of the American Ceramic Society*, vol. 66, No. 10, Oct. 1983, pp. 683–688.
Boganov et al., "Threshold of Light Breakdown in Hydroxyl-Free High-Purity Vitreous Silica", *Soviet Journal of Glass Physics and Chemistry*, vol. 6, No. 5, Sept./Oct. 1980, pp. 383–390, (English language translation by Plenum Publishing Corporation).

*Primary Examiner*—William R. Dixon, Jr.
*Assistant Examiner*—Hollenbeck, Sue E.
*Attorney, Agent, or Firm*—Lowe, Price, Leblanc, Becker & Shur

[57] ABSTRACT

A process for the production of a glass by the vacuum melting method using silica as a raw material is disclosed, comprising filing a silica fine powder in a suitable vessel, heating it in the presence of an accelerator for phase conversion to obtain a porous formed body consisting of a cristobalite phase, and then heating and melting the formed body in vacuo. According to the present invention, a transparent and active glass having a high quality can be produced at an inexpensive cost.

8 Claims, No Drawings

PROCESS FOR THE PRODUCTION OF GLASS

This application is a continuation of Application Ser. No. 042,570, filed Apr. 22, 1987 which is a continuation of Application Ser. No. 767,194 filed Aug. 19, 1985 abandoned.

FIELD OF THE INVENTION

The present invention relates to a process for the production of a quartz glass by the vacuum melting method using silica as a raw material, by which process a transparent or active, high-quality glass can be produced at a low production cost.

BACKGROUND OF THE INVENTION

In general, glasses as industrial products are produced by heating raw material powders prepared in a prescribed mixing proportion in a crucible or a tank furnace at temperatures higher than the liquidus temperature to form a homogeneous mixture in the melting state and then quenching the mixture. In the production of glass, the glass is usually made transparent by, for example, a means in which the bubbles in the melt formed from adsorbed gas in the raw materials and the gas generation during the reaction are removed by thoroughly elevating the temperature of the melt to reduce the viscosity of the melt and floating the gases or air bubbles.

However, in the case of producing a glass from silica as the raw material, because of its high melting point, the temperature cannot be elevated to an extent effective for the bubble-removing owing to the restrictions in refractories of the crucible or furnace or other reasons and if the temperature is elevated excessively, gases are generated by the volatilization of the raw material per se and the reaction between the raw material and the crucible form bubbles. Therefore, the above-described method cannot be employed. For the reasons set forth above, a method for the production of a transparent quartz glass using silica as the raw material is restricted to either one of a generally known Verneuil method, a zone melting method, or a vacuum melting method.

The Verneuil method is a method in which a silica powder is gradually fed into an argon-oxygen plasma flame or an oxygen-hydogen flame and melted for glass formation and the resulting melt is deposited onto a stand, and the generated gases are dissipated from the surface.

The zone melting method is a method in which a porous body composed of a silica fine powder is prepared and melted from one end thereof in a band-like state for glass formation, and the generated gases leave through the unmelted porous body.

The vacuum melting method is a method in which a rock crystal powder prepared to have a particle diameter of about 100 μm is placed in a crucible and melted in a vacum heating furnace for glass formation, and the generated gases are removed by force.

However, with respect to the Verneuil method and the zone melting method, it is well known that an extremely long period of time is required for producing one glass block and its productivity is poor, and especially in the case of the Verneuil method, the yield is extermley low, 30% to 40%. Further, when the argon-oxygen plasma flame is employed as a heat source, though a glass having a small number of residual OH groups and a relatively small number of bubbles can be obtained, the energy cost is high, whereas when the oxygen-hydrogen flame which is cheap in the energy cost is employed, a product having a large number of residual OH groups is obtained. Still further, since the shape of ingots which can be produced is restricted to a cylindrical and slender one, there is a further disadvantage to the subsequent processings.

According to the vacuum melting method, though a relatively large-sized ingot having a small number of residual OH groups and a high viscosity at high temperatures can be obtained, since the raw material powder filled in a vessel such as a crucible is melted for glass formation, not only is there a disadvantage to the debubbling but also a reaction gas caused by the contact with the vessel is generated and the resulting glass has a relatively large number of bubbles. Therefore, those having a high quality cannot be obtained. Further, because of the use of the rock crystal powder, there is a disadvantage to the raw material supply due to exhaustion of resources.

SUMMARY OF THE INVENTION

The present invention is hereby proposed to provide a process for obtaining a quartz glass by the vacuum melting method using as a raw material a silica powder which is not restricted in terms of resources, by which process a large-sized ingot having a high purity can be produced and which process is excellent in productivity and economy.

The present invention relates to a process for the production of a glass, comprising filling a silica powder in a suitable vessel, heating it in the presence of an accelerator for phase conversion, such as alkali metal compounds to form a porous sintered body consisting of a cristobalite phase, and heating and melting the sintered body in vacuo for glass formation. That is, the present invention relates to a process for the production of a glass, comprising a calcination step for obtaining a sintered body consisting of a cristobalite phase using a silica powder and a glass formation step for heating and melting the porous, standing sintered body obtained by the above calcination step in vacuum for glass formation.

DETAILED DESCRIPTION OF PREFERRED EMBODIMENTS

When a glass is produced using silica as a raw material, as described above, the Verneuil method by which a relatively high-quality product can be obtained has disadvantages in productivity and the like. On the other hand, the vacuum melting method by which a relatively large-sized ingot can be obtained has a disadvantage in debubbling, and hence, a product having a high quality cannot be obtained. The present inventors have made extensive investigations on the debubbling problem which the conventional methods cannot solve as well as the difficult problem of the raw material supply due to the use of a rock crystal powder, while considering the characteristics of the vacuum melting method, and found that a satisfactory degassing processing can be achieved by converting the raw material silica into a sintered body consisting of a cristobalite phase and then melting the sintered body in vacuum.

It is known that heating crystalline silica causes phase conversion from a low-temperature quartz phase to a tridymite phase and further to a cristobalite phase, depending upon the heating temperature in the heating step. This phase conversion hardly takes place when silica is used singly, but it readily takes place when a certain metal compound is added to silica or silica containing a metal compound is used. For example, $Li_2O$, $Na_2O$, $K_2O$, $MgO$, $CaO$, $P_2O_5$, and $B_2O_3$ are known to be useful as an accelerator for phase conversion. On the other hand, since amorphous silica is dissolved directly when used alone, in order that it is crystallized into a cristobalite phase, the addition of the above-described additives is required. As will be understood from the foregoing explanation concerning the prior art techniques, in the conventional methods, if such a metal compound is incorporated in the raw material, there is caused a factor to reduce the purity of a final product as in the case of impurities such as water, and hence, it is not desirable. That is, since in the conventional methods, there is an opposite relation between obtaining a high-purity quartz glass and adding impurities to the raw material, it is required to use a high-purity raw material for high purity quartz glass productions. Accordingly, in the prior art techniques, there is no concept to incorporate a metal compound into the raw material or to use the raw material containing a metal compound as in the present invention.

In view of a foregoing facts, it can be said that the method of the present invention in which an accelerator for phase conversion is added to silica or silica containing an effective component for the phase conversion is selectively used is peculiar, and the characteristics of a sintered body consisting of a cristobalite phase give rise to a number of effects coupled with the employment of the vacuum melting method. In other words, as is well known, since the melting temperature of the sintered body is uniquely determined by the cristobalite phase, the sintered body can be heated at the temperature right below the melting point and subjected to the degassing processing. Further, since the sintered body consisting of a cristobalite phase is a porous body having open pores, it can be degassed thoroughly and readily. Still further, since some accelerators for phase conversion are readily vaporized at temperatures below the melting point of the sintered body, if such an accelerator is selectively used, a transparent quartz glass from which the impurities have almost completely been removed can be obtained. On the other hand, if an accelerator which is not decomposed and removed is selected, an active glass containing only the accelerator can be obtained. In summary, in the present invention, the metal compounds which were considered to be impurities in the prior art techniques are indispensable and effectively function in practicing the present invention.

Next, as an actual example, a process for producing a transparent quartz glass ingot using an amorphous silica fine powder as the raw material is explained.

For example, an accelerator for phase conversion is added to and mixed with an amorphous silica fine powder which is obtained by oxidizing silicon tetrachloride. As the accelerator for phase conversion, one of the alkali metal compounds can be selected, but according to the knowledge of the present inventors, if it is contemplated to obtain a transparent quartz glass, an Na additive is effectively used as one which can be most readily vaporized. An amount of the Na additive to be added is an amount in which the sintered body consisting of a cristobalite phase can be readily obtained. According to experiments made by the present inventors, the invention can be practiced within the range of from 100 ppm to 2,000 ppm in terms of weight ratio to the raw material powder. If the amount is below the lower limit, there is caused a problem in the crystallization, whereas if it exceeds the upper limit, there is caused a problem in the debubbling processing. Accordingly, if operability is also taken account, it is desirable to synthesize an amorphous silica fine powder containing about 1,000 ppm, based on the weight of the raw material powder, of an Na additive.

The following method can be employed as a means for adding the Na additive. That is, since when the amorphous silica fine powder is added to the water purified through ion-exchange resin and the mixture is stirred, there is obtained a dispersion in which the solid can be hardly separated from the liquid (i.e., a sol), the Na additive is added in the NaOH state to the sol. Alternatively, the amorphous silica fine powder is added to the water purified through ion-exchange resin to which the Na additive has been previously added in the NaOH state, and the mixture is stirred, whereby Na ion is uniformly deposited onto the fine powder. A practical useful amount of the Na additive to be deposited is about 1,000 ppm in terms of weight ratio, and in order to achieve this, the solution may be prepared such that it contains about 2,300 ppm of the Na additive in terms of weight ratio. A solution containing the Na additive-deposited amorphous silica fine powder is dehydrated and dried for repowdering by a suitable means. A commercially available amorphous silica fine powder is usually a fine powder having a size of about 0.02 $\mu$m or less, and hence, if it is crystallized by heating, the sintering rapidly proceeds whereby a dense sintered body can be obtained. Thus, it is important to avoid such matter. That is, it is desirable that the pore of the resulting sintered body consisting of a cristobalite phase is so large as to leave the residual gas and so small as to have a suitable rigidity and correspond to the shrinkage at the melting in the glass forming process. In order to meet this requirement, the solution containing the Na additive-deposited amorphous silica is, for example, dispensed in a suitable vessel and frozen in a freezer, or frozen by means of a known ice making apparatus. The resulting solution is defrosted spontaneously or by an optional means, such as heating. The sol consisting of amorphous silica and water is thus separated into two phases, i.e., solid and liquid. The supernatant is disposed, and the aggregate of amorphous silica retained in the bottom of the vessel is dehydrated and dried. The dried and repowdered amorphous silica fine powder is controlled with respect to granularity by simple fragmentation, whereby the fine powders are aggregated to obtain a powder having a particle diameter of from about 50 to 500 $\mu$m, the original diameter of which was about 0.02 $\mu$m or less.

The thus obtained amorphous silica fine powder is filled in, for example, a mullite container having a high-temperature strength and is heated at 1,000° C., or higher by an optional heating means to convert it into a sintered body consisting of a cristobalite phase. At this time, it is desirable that the temperature-elevating rate is as low as possible. The thus obtained sintered body is a porous body which has a shape corresponding to that of the filling container, has open pores, and which has a rigidity free from any problem in standing and transportation. This sintered body consists essentially of a $\beta$-cristobalite phase and is a high temperature-type cristobalite crystal. When the sintered body is quenched to invert it into a low temperature-type $\alpha$-cristobalite phase, fine cracks are generated by a volume reduction of about 6%. If the thus cracked crystal is melted for glass formation, the formation of cracks is further accelerated, and therefore, a desired product is hardly obtainable. It is known that the inversion from the $\beta$-cristobalite phase to the $\alpha$-cristobalite phase takes place at a temperature between 220° C. and 275° C. Accordingly, it is desirable that the sintered body obtained by heating to about 1,000° C. is transferred to the glass formation process while maintaining the temperature at the inversion temperature or higher.

The glass formation process step is carried out in a method similar to the known vacuum melting method, and the sintered body consisting of a cristobalite phase, which is obtained by the calcination process, is heated and melted in vacuo for glass formation. At this time, for the reasons as described above, the glass formation process is carried out by placing the sintered body in a vacuum heating furnace and putting it on a shallow tray without charging it in a crucible, while maintaining the $\beta$-cristobalite crystal state (i.e., keeping the temperature at about 300° C. or higher). This is because not only can the sintered body have a satisfactory rigidity against transportation and stand by itself, but also the degassing is rendered easy and contamination caused by the contact with the crucible can be prevented.

In the vacuum heating furnace, the process is carried out in a reduced pressure of 0.5 mb or less at a temperature of 1,730° C. or higher. Since the sintered body is a porous body having open pores, the impurities in the sintered body and the Na additive for crystallization and sintering are readily vaporized upon heating at the respective vaporization temperatures. Further, since the sintered body consists of a cristobalite phase of the temperature right below the melting point and the melting point of the cristobalite phase is unique, the degassing processing can be extremely effectively carried out. That is, when the melting takes place step by step, the porous state is partly broken and the route for degassing is clogged, whereby the degassing cannot be satisfactorily carried out. However, as described above, because the melting point of the sintered body is uniquely determined by the cristobalite phase, there are not found such troubles. Still further, unless the decomposition reaction occurs, the higher the temperature, the more effective the removal of adsorbed, reaction residual gases. In the present invention, the degassing can be carried out by elevating the temperature to the temperature right below the melting point. Thus according to the vacuum heating processing of the present invention, the interior portion of the sintered body is made substantially in vacuo until it has been melted, and the Na additive of 1,000 ppm added for crystallization is reduced to an order of several ppm or less, whereby a transparent quartz glass having less impurities and free from bubbles and cracks can be obtained.

While the invention has been described with reference to a specific embodiment in which an amorphous silica fine powder is added with an Na additive as an accelerator for phase conversion, those containing an Na additive, such as colloidal silica, can also be used as the raw material. Further, in the case of obtaining a transparent quartz glass, accelerators for phase conversion which are decomposed at the temperature right below the melting point of the sintered body and are readily vaporized are selected. The present inventors have experimentally confirmed that alkali metal compounds are useful as such an accelerator for phase conversion and that among them, Na is an effective additive for most shortening the glass formation time.

As is clear from the foregoing description, the present invention is characterized by converting a silica fine powder into a sintered body consisting of a cristobalite phase and subjecting the sintered body to the vacuum melting method. Accordingly, in addition to the accelerator for phase conversion, known additives for activation can be added to obtain an active glass in which only the active additives are retained. Further, it is possible to selectively use an accelerator for phase conversion which functions for activation such that it is not positively removed from the final product. For example, a silica fine powder containing 0.3 mol% of $Nd_2O_3$ and 3 mol% of $P_2O_5$ is granulated into a secondary particle by the above-described pre-treatment and then calcined at about 1,300° C. to convert into a sintered body consisting of a cristobalite phase. The sintered body is then heated and melted at 1,700° C. in a vacuum furnace, whereby a laser glass can be effectively produced. Accordingly, this method can be employed for the production of various active glasses, such as photochromic glass, filter glass, heat-absorbing glass and the like, in addition to the laser glass, by doping active ions.

The process for the production of a glass according to the present invention is a glass production process of an organic combination of a calcination process for converting a silica fine powder into a sintered body consisting of a cristobalite phase and a glass formation process for heating and melting the sintered body in vacuo, and has a number of characteristics and effects which have not been found in the conventional methods. In the case of producing a high-viscosity glass such as a quartz glass, the present invention cannot only solve the poor yield and poor productivity (i.e., an extremely long operation time for glass formation is required) which have been unable to be avoided by the conventional methods but also provide a product at an inexpensive cost, coupled with no necessity of a particularly expensive heat source.

In addition, while the present invention employs the vacuum melting method, it can solve all of the problems which cannot be solved by the conventional methods, such as the generation of bubbles because of insufficient degassing and the contamination caused by the contact with a vessel, a glass ingot having a high purity can be produced.

The present invention is described in further detail with reference to the following examples, but it is not to be construed that the present invention is limited thereto.

EXAMPLE 1

In a water tank stored with the water purified through ion-exchange resin was charged 15 kg of an amorphous silica powder having a particle diameter of about 0.02 $\mu$m or less, and an aqueous solution of 60 g of NaOH dissolved in about 500 ml of the water purified through ion-exchange resin was further charged thereinto, followed by stirring the mixture for about one hour. The resulting amorphous silica-water sol was dispensed in a 10 l stainless steel vessel and then stored in a freezer for freezing. The frozen sol was taken out and spontaneously defrosted. The resulting sol was separated into two phases: a solid and a liquid. The sol was poured out above a 200 mesh net plate and dehydrated. The residue was brought in a dryer and dried at about 130° C. Since the resulting powder was in the agglomerated state, it was simply fragmented by means of a pulverizer to granulate into a secondary particle having a particle diameter of from 50 μm to 500 μm.

The powder was filled in a mullite cylindrical container having an inside diameter of 270 mm and a height of 600 mm and heated to 1,100° C. by an electrical furnace. The heating was carried out in such a pattern that it took about 40 hours to elevate the temperature to 1,100° C. and it took about 4 hours to maintain the temperature at 1,100° C. There was thus obtained a cylindrical sintered body consisting of a cristobalite phase having an outer diameter of 160 mm and a height of 350 mm. This sintered body could stand by itself and had a rigidity to such an extent that it did not completely deform during the transportation, and further, it was rich in porous properties. The sintered body was brought into a vacuum furnace while keeping it at 500° C. or higher and heated and melted for glass formation under a reduced pressure of 0.5 mb or less at a temperature of 1,750° C. The program for heating was in such a manner that it took about 6 hours to elevate the temperature to 1,600° C. and it was kept about one hour at 1,750° C. After completion of the heating, the vitrified body was cooled for about 2 hours and then taken out. There was thus obtained about 10 kg of an ingot of a high-purity, crack-free transparent quartz glass having an outer diameter of 150 mm and a height of 260 mm.

EXAMPLE 2

200 g of an amorphous silica fine powder was mixed with 2,500 g of the water purified through ion-exchange resin, and the mixture was stirred for about one hour. Thereafter, 200 g of an aqueous solution containing 7.2 g of $NdCl_3.6H_2O$ was further added thereto, and the mixture was stirred for about one hour. The resulting sol was dispensed in a 5 l stainless steel vessel, and the same procedures as in Example 1 were followed to obtain a powder having secondary particles of from 50 μm to 500 μm in particle diameter.

The silica fine powder was filled in a mullite cylindrical container having an inside diameter of 30 mm and a height of 100 mm and heated to 1,100° C. by an electric furnace. The heating was carried out in such a pattern that it took about 20 hours to elevate the temperature to 1,100° C. and it took about 5 hours to maintain the temperature at 1,100° C. There was thus obtained a cylindrical sintered body consisting of a cristobalite phase having an outer diameter of 18 mm and a length of 60 mm. This sintered body was then brought into a vacuum furnace while keeping it at 500° C. or higher and heated for glass formation under a reduced pressure of 0.5 mb or less at a temperature of 1,750° C. The program for heating was in such a manner that it took about 3 hours to elevate the temperature to 1,600° C. and it was kept about one hour at 1,750° C. There was thus obtained about 20 g of a bluish purple, transparent glass having an outer diameter of 15 mm and a height of 51 mm.

EXAMPLE 3

200 g of an amorphous silica fine powder was mixed with 2,500 g of the water purified through ion-exchange resin, and the mixture was stirred for about one hour. Thereafter, 100 g of an aqueous solution containing 0.8 g of NaOH was further added thereto, and the mixture was stirred for about one hour. 0.5 g of $TiCl_4$ was gradually added thereto, and the stirring was continued for an additional period of about one hour. The resulting sol was processed in the same manner as in Example 1 to obtain a powder having secondary particles of from 50 μm to 500 μm in particle diameter. This powder was subjected to glass formation processing under the same condition as in Example 2 to obtain about 20 g of a bluish purple homogeneous glass having an Na additive of about 2 ppm and a Ti additive of about 300 ppm and having an outer diameter of 15 mm and a height of 51 mm.

While the invention has been described in detail and with reference to specific embodiments thereof, it will be apparent to one skilled in the art that various changes and modifications can be made therein without departing from the spirit and scope thereof.

What is claimed is:

1. A process for the production of a high-purity quartz glass comprising the steps of:
   incorporating an accelerator for phase conversion into silica powder having a particle size of not greater than about 0.02 μm to form accelerator-containing silica powder having a particle size of 50 μm–500 μm, said accelerator for phase conversion containing at least one alkali metal;
   placing the resulting powder in a vessel and heating the same to form a self-supporting porous sintered body consisting essentially of β-cristobalite phase;
   transferring the porous sintered body to a vacuum melting furnace while maintaining the temperature of the porous sintered body at a temperature not lower than the inversion temperature from β-cristobalite phase to α-cristobalite phase;
   heating the porous sintered body in the vacuum melting furnace while maintaining the β-cristobalite phase to degas the accelerator and any other impurities contained in the porous sintered body; and
   raising the temperature in the vacuum melting furnace to a temperature higher than the melting point of the porous sintered body to melt the sintered body and form quartz glass.

2. A prrocess for the production of a glass as claimed in claim 1, wherein the accelerator for phase conversion comprises an Na additive, and the Na additive is incorporated into the silica powder in an amount of from 100 ppm to 2,000 ppm in terms of weight ratio to the silica powder.

3. A process for the production of a glass as claimed in claim 1, wherein the porous sintered body is heated in vacuum to a temperature not less than 1730° C. to effect melting.

4. The process of claim 1, wherein the incorporation step comprises the steps of:
   mixing the silica powder with a solution containing the alkali metal;
   freezing the resulting mixture;
   thawing and dehydrating the frozen mixture; and
   drying the dehydrated mixture to provide the accelerator-containing powder.

5. A process for the production of a high-purity quartz glass comprising the steps of:
   incorporating an accelerator for phase conversion into silica powder having a particle size of not greater than about 0.02 μm to form accelerator-containing powder having a particle size of 50 um–500 um, said accelerator containing at least one alkali metal and an active ingredient;
   placing the resulting accelerator-containing powder in a vessel and heating the same to form a self-supporting porous sintered body consisting essentially of β-cristobalite phase;

transferring the porous sintered body to a vacuum melting furnace while maintaining the temperature of the porous sintered body at a temperature not lower than the inversion temperature from β-cristobalite phase to α-cristobalite phase;

heating the porous sintered body in the vacuum melting furnace while maintaining the β-cristobalite phase to degas the accelerator and any other impurities contained in the porous sintered body, the active ingredient remaining in the porous sintered body; and raising the temperature in the vacuum melting furnace to a temperature higher than the melting point of the porous sintered body to melt the sintered body and form quartz glass.

6. A process for the production of a glass as claimed in claim 5, wherein the accelerator for phase conversion comprises an Na additive, and the Na additive is incorporated into the silica powder in an amount of from 100 ppm to 2,000 ppm in terms of weight ratio of the silica powder.

7. The process of claim 5, wherein the porous sintered body is heated in vacuum to a temperature not less than 1730° C. to effect melting.

8. The process of claim 5, wherein the incorporation step comprises the steps of:

mixing the silica powder with a solution containing the alkali metal and the active ingredient;

freezing the resulting mixture;

thawing and dehydrating the frozen mixture; and drying the dehydrated mixture to provide the accelerator-containing powder.

* * * * *